United States Patent
Werner et al.

(10) Patent No.: US 9,677,887 B2
(45) Date of Patent: Jun. 13, 2017

(54) ESTIMATING AN INITIAL POSITION AND NAVIGATION STATE USING VEHICLE ODOMETRY

(71) Applicant: QUALCOMM Incorporated, San Diego, CA (US)

(72) Inventors: Benjamin A. Werner, Santa Clara, CA (US); William James Morrison, San Francisco, CA (US); Wyatt Thomas Riley, Chesterbrook, PA (US); Joseph Czompo, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 165 days.

(21) Appl. No.: 14/087,743

(22) Filed: Nov. 22, 2013

(65) Prior Publication Data
US 2014/0288828 A1 Sep. 25, 2014

Related U.S. Application Data

(60) Provisional application No. 61/804,505, filed on Mar. 22, 2013.

(51) Int. Cl.
*G01C 21/00* (2006.01)
*G01C 21/20* (2006.01)

(52) U.S. Cl.
CPC ............ *G01C 21/00* (2013.01); *G01C 21/20* (2013.01)

(58) Field of Classification Search
CPC .................................. G01C 21/00; G01C 21/20
See application file for complete search history.

(56) References Cited

U.S. PATENT DOCUMENTS

| 5,359,521 | A | | 10/1994 | Kyrtsos et al. |
| 5,808,565 | A | | 9/1998 | Matta et al. |
| 5,862,511 | A | | 1/1999 | Croyle et al. |
| 5,961,571 | A | * | 10/1999 | Gorr et al. ..................... 701/494 |
| 5,970,481 | A | | 10/1999 | Westerlage et al. |
| 7,756,615 | B2 | | 7/2010 | Barfoot et al. |

(Continued)

OTHER PUBLICATIONS

International Search Report and Written Opinion—PCT/US2014/031419—ISA/EPO—Aug. 29, 2014.

*Primary Examiner* — Redhwan K Mawari
*Assistant Examiner* — Alan D Hutchinson
(74) *Attorney, Agent, or Firm* — Muncy, Geissler, Olds & Lowe, P.C.

(57) ABSTRACT

The disclosure relates to estimating an initial position and navigation state associated with a vehicle using odometry and/or other data obtained from the vehicle to support dead reckoning at start-up. In particular, a last known position and last known heading at a first odometer value associated with the vehicle may be stored and compared to a current odometer value after linking a mobile device with the vehicle. The last known position and last known heading may be used to estimate the initial position and navigation state associated with the vehicle based on a difference between the compared odometer values. For example, the estimated initial position and/or navigation state may substantially correspond to the last known position and last known heading if the difference between the odometer values indicates no change, or a non-zero difference may define a radius to limit an estimated error associated with the initial position estimate.

30 Claims, 5 Drawing Sheets

(56) References Cited

U.S. PATENT DOCUMENTS

| | | |
|---|---|---|
| 7,761,062 B2 | 7/2010 | Mervine |
| 2003/0200067 A1 | 10/2003 | Johnson et al. |
| 2009/0005070 A1* | 1/2009 | Forstall et al. ............ 455/456.1 |
| 2009/0063051 A1 | 3/2009 | Watanabe et al. |
| 2010/0130229 A1 | 5/2010 | Sridhara et al. |
| 2011/0077816 A1 | 3/2011 | Biondo et al. |
| 2011/0257882 A1* | 10/2011 | McBurney ............. G01C 21/30 701/532 |
| 2011/0313650 A1 | 12/2011 | Tome |

* cited by examiner

ESTIMATING AN INITIAL POSITION AND NAVIGATION STATE USING VEHICLE ODOMETRY

CROSS-REFERENCE TO RELATED APPLICATIONS

The present Application for Patent claims the benefit of U.S. Provisional Application No. 61/804,505, entitled "POSITION AND NAVIGATION STATE INITIALIZATION USING ODOMETRY AND PROXIMITY," filed Mar. 22, 2013, assigned to the assignee hereof, and expressly incorporated herein by reference in its entirety.

FIELD OF DISCLOSURE

Various embodiments described herein generally relate to estimating an initial position and navigation state using vehicle odometry, and in particular, to using the vehicle odometry, data obtained from one or more vehicle sensors, modeled vehicle dynamics, or other suitable vehicle parameters on a mobile device to support dead reckoning at start-up from a last known vehicle position and navigation state.

BACKGROUND

Mobile communications networks are in the process of offering increasingly sophisticated capabilities associated with the motion and/or position location sensing of a mobile device. New software applications, such as, for example, those related to personal productivity, collaborative communications, social networking, and/or data acquisition, may utilize motion and/or position sensors to provide new features and services to consumers. Moreover, some regulatory requirements of various jurisdictions may require a network operator to report the location of a mobile device when the mobile device places a call to an emergency service, such as a 911 call in the United States.

Such motion and/or position determination capabilities have conventionally been provided using digital cellular positioning techniques and/or Satellite Positioning Systems (SPS). Additionally, with the increasing proliferation of miniaturized motion sensors (e.g., simple switches, accelerometers, angle sensors, etc), such on-board devices may be used to provide relative position, velocity, acceleration, and/or orientation information.

In conventional digital cellular networks, position location capability can be provided by various time and/or phase measurement techniques. For example, in CDMA networks, one position determination approach used is Advanced Forward Link Trilateration (AFLT). Using AFLT, a mobile device may compute its position from phase measurements of pilot signals transmitted from a plurality of base stations. Improvements to AFLT have been realized by utilizing hybrid position location techniques, where the mobile device may employ an SPS receiver that can provide position information independent of the information derived from the signals transmitted by the base stations. Moreover, position accuracy can be improved by combining measurements derived from both SPS and AFLT systems using conventional techniques.

Furthermore, navigation devices often support popular and increasingly important SPS wireless technologies which may include, for example, the Global Positioning System (GPS) and/or a Global Navigation Satellite System (GNSS). Navigation devices supporting SPS may obtain navigation signals as wireless transmissions received from one or more transmitter equipped satellites that may be used to estimate geographic position and heading. Some navigation devices may additionally or alternatively obtain navigation signals as wireless transmissions received from terrestrial based transmitters to estimate geographic position and heading and/or include one or more on-board inertial sensors (e.g., accelerometers, gyroscopes, etc.) to measure an inertial state of the navigation device. Inertial measurements obtained from these on-board inertial sensors may be used in combination with or independent of navigation signals received from satellite and/or terrestrial based transmitters and/or inertial sensors on a vehicle (e.g., accelerometers, gyroscopes, odometers, etc.) to provide estimates of geographic position and heading.

However, conventional position location techniques based upon signals provided by SPS and/or cellular base stations may encounter difficulties when the mobile device is operating within a building and/or within urban environments. In such situations, signal reflection and refraction, multipath, and/or signal attenuation can significantly reduce position accuracy, and can slow the "time-to-fix" to unacceptably long time periods. These shortcomings may be overcome by having the mobile device exploit signals from other existing wireless networks (e.g., a wireless local area network (WLAN) that implements one or more 801.11x standards) to derive position information. Conventional position determination techniques used in other existing wireless networks may utilize a received signal strength indicator (RSSI) or round trip time (RTT) measurements derived from signals utilized within these networks and/or knowledge relating to time delays that the signals incur when propagating through various devices that make up the network. Such delays may be spatially variant due to, for example, multipath and/or signal interference. Moreover, such processing delays may change over time based upon the type of network device and/or the network device's current networking load.

Accordingly, conventional methods to augment position estimation using signals from SPS and/or cellular base stations and/or other existing wireless networks tend to be insufficient to effectively reduce error or location uncertainty. Moreover, using WLAN signals may incur additional costs in terms of hardware changes in wireless access points, time-consuming pre-deployment fingerprinting, and/or operational environment calibration, which may not be optimally exploited due to the existing limitations mentioned above. Further still, although sensor-assisted navigation techniques may use inertial sensors to overcome limitations associated with GPS and/or GNSS technology alone (e.g., when satellite signals may be unavailable in a parking garage or tunnel or severely degraded in urban canyons and other environments where sightlines to satellites may be blocked or subject to multipath propagation), existing sensor-assisted navigation techniques (e.g., dead reckoning techniques) typically advance a previous location fix according to known or estimated velocities and headings to calculate the current position and thereby navigate from the previous location fix. Furthermore, when navigating from absolute rest, existing sensor-assisted navigation techniques may not have any knowledge relating to an initial position until and/or unless GPS and/or GNSS signals can be suitably acquired and tracked, and moreover, an initial heading or other navigation state may be unavailable until sufficient vehicle movement has occurred to enable the inertial sensors to determine velocities or other suitable parameters that may indicate the heading. In other words, existing sensor-assisted navigation techniques tend to fall short in suitably providing an initial position estimate and navigation state at start-up because a previously determined position to advance may not exist and because an initially stationary device does not have any data available to estimate current velocities or headings (e.g., sensors that know wheel diameters and record wheel rotations and steering directions may not produce any relevant velocity or heading readings while in a stationary state).

SUMMARY

The following presents a simplified summary relating to one or more aspects and/or embodiments associated with the mechanisms disclosed herein to initialize a position and navigation state using odometry and proximity. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein to initialize a position and navigation state using odometry and proximity in a simplified form to precede the detailed description presented below.

According to one exemplary aspect, the disclosure relates to estimating an initial vehicle position and navigation state using odometry or other suitable vehicle parameters (e.g., data obtained from vehicle sensors) to support dead reckoning at start-up. In particular, a mobile device may store a last known vehicle position and heading at a first odometer value, or the last known vehicle position and heading at the first odometer value may alternatively (or additionally) be stored on a server. The vehicle position and heading at the first odometer value may subsequently be compared to a current odometer value after a link with the vehicle has been established (e.g., a link between the mobile device, a navigation unit, another mobile device, etc.), wherein the last known position and heading may then be used to estimate the initial vehicle position and navigation state based on a difference between the first and current odometer values. For example, the current odometer value associated with the vehicle may comprise a cumulative odometer value stored on the vehicle, whereby the estimated initial position and navigation state may substantially correspond to the last known position and heading if the current odometer value difference indicates no change, or a non-zero difference may alternatively define a radius that limits an estimated error associated with the estimated initial position.

According to one exemplary aspect, a method for estimating an initial position and navigation state may comprise, among other things, storing a last known position associated with a vehicle at a first odometer value associated with the vehicle in a suitable memory (e.g., a memory associated with a server, a mobile device, etc.), comparing the first odometer value to a current odometer value associated with the vehicle response to a mobile device establishing a link with the vehicle, and using the last known position at the first odometer value to estimate the initial position and navigation state associated with the vehicle based on a difference between the first odometer value and the current odometer value. For example, if the current odometer value indicates no change from the first odometer value, the estimated initial position may substantially correspond to the last known position at the first odometer value. Additionally, in one embodiment, the method may further comprise storing a last known heading associated with the vehicle at the first odometer value, wherein the estimated initial navigation state may comprise the last known heading at the first odometer value if the current odometer value indicates no change from the first odometer value.

According to another exemplary aspect, the method may define a radius to limit an estimated error associated with the estimated initial position in response to determining that the first odometer value and the current odometer value have a non-zero difference and estimating the initial position associated with the vehicle based on the defined radius in combination with one or more of data obtained from one or more satellites or data stored on the vehicle in response to the first odometer value and the current odometer value having a non-zero difference. Furthermore, the estimated error associated with the estimated initial position may be scaled according to the non-zero difference between the first odometer value and the current odometer value, whereby the method may further comprise determining whether to use the estimated initial position or calculate the initial position based on data from one or more satellites based on the scaled estimated error.

According to another exemplary aspect, the method may further comprise associating the last known position associated with the vehicle at the first odometer value with an identifier that corresponds to the vehicle. As such, the mobile device may assume a beacon role to share at least the last known position at the first odometer value over one or more communication interfaces (e.g., based on the vehicle identifier) and other mobile devices may retrieve the last known position stored in the memory (e.g., based on the vehicle identifier), compare the first odometer value to the current odometer value associated with the vehicle in response to establishing a link with the vehicle, and likewise use the retrieved last known position and a last known heading to estimate the initial position and navigation state associated with the vehicle based on the difference between the first odometer value and the current odometer value.

According to another exemplary aspect, the method may further comprise initializing a navigation route based on the estimated initial position and navigation state, storing one or more models associated with the vehicle in the memory, and using the estimated initial navigation state and the one or more models associated with the vehicle (e.g., parameters relating to one or more of a last known sensor bias, an odometry scale factor, an estimated lever arm, turning rate statistics, velocity statistics, vehicle motion statistics, etc.) to perform dead reckoning from the estimated initial position (e.g., according to the initialized route). Additionally, in one embodiment, the method may further comprise using the one or more models to determine whether a current position associated with the vehicle has substantially changed from the last known position despite the current odometer value indicating no change from the first odometer value and calculating the initial position associated with the vehicle based on one or more of data from one or more satellites or data stored on the vehicle in response to the one or more models indicating that the current position associated with the vehicle has substantially changed from the last known position.

According to another exemplary aspect, an apparatus may comprise means for storing a last known position associated with a vehicle at a first odometer value associated with the vehicle, means for comparing the first odometer value to a current odometer value associated with the vehicle response to a mobile device establishing a link with the vehicle, and means for using the last known position at the first odometer value to estimate an initial position and an initial navigation state associated with the vehicle based on a difference between the first odometer value and the current odometer value. For example, if the current odometer value indicates no change from the first odometer value, the estimated initial position may substantially correspond to the last known position at the first odometer value. Additionally, in one embodiment, the apparatus may further comprise means for storing a last known heading associated with the vehicle at the first odometer value, wherein the estimated initial navigation state may comprise the last known heading at the first odometer value if the current odometer value indicates no change from the first odometer value.

According to another exemplary aspect, the apparatus may comprise means for defining a radius to limit an estimated error associated with the estimated initial position in response to determining that the first odometer value and the current odometer value have a non-zero difference and means for estimating the initial position associated with the vehicle based on the defined radius in combination with one or more of data obtained from one or more satellites or data stored on the vehicle in response to the first odometer value and the current odometer value having a non-zero difference. Furthermore, the apparatus may comprise means for scaling the estimated error associated with the estimated initial position according to the non-zero difference between the first odometer value and the current odometer value and means for determining whether to use the estimated initial position or calculate the initial position based on data from one or more satellites based on the scaled estimated error.

According to another exemplary aspect, the apparatus may further comprise means for associating the last known position associated with the vehicle at the first odometer value with an identifier that corresponds to the vehicle. As such, the apparatus may assume a beacon role to share at least the last known position at the first odometer value over one or more communication interfaces (e.g., based on the vehicle identifier) and another mobile device or other suitable apparatus may likewise retrieve the stored last known position (e.g., based on the vehicle identifier), compare the first odometer value to the current odometer value associated with the vehicle in response to establishing a link with the vehicle, and use the retrieved last known position and a last known heading to estimate the initial position and navigation state associated with the vehicle based on the difference between the first odometer value and the current odometer value.

According to another exemplary aspect, the apparatus may further comprise means for initializing a navigation route based on the estimated initial position and navigation state, means for storing one or more models associated with the vehicle, and means for using the estimated initial navigation state and the one or more models associated with the vehicle (e.g., parameters relating to one or more of a last known sensor bias, an odometry scale factor, an estimated lever arm, turning rate statistics, velocity statistics, vehicle motion statistics, etc.) to perform dead reckoning from the estimated initial position (e.g., according to the initialized route). Additionally, in one embodiment, the apparatus may further comprise means for using the one or more models to determine whether a current position associated with the vehicle has substantially changed from the last known position despite the current odometer value indicating no change from the first odometer value and means for calculating the initial position associated with the vehicle based on one or more of data from one or more satellites or data stored on the vehicle in response to the one or more models indicating that the current position associated with the vehicle has substantially changed from the last known position.

According to another exemplary aspect, an apparatus (e.g., a navigation unit, a mobile device, etc.) may comprise a memory configured to store a last known position associated with a vehicle at a first odometer value associated with the vehicle. Additionally, the apparatus may comprise one or more processors configured to compare the first odometer value to a current odometer value associated with the vehicle in response to a mobile device establishing a link with the vehicle and estimate an initial position and navigation state associated with the vehicle using the last known position at the first odometer value based on a difference between the first and current odometer values. For example, in one embodiment, the estimated initial position may substantially correspond to the last known position at the first odometer value if the current odometer value indicates no change from the first odometer value. Furthermore, in one embodiment, the memory may be further configured to store a last known heading at the first odometer value, wherein the estimated initial navigation state may comprise the last known heading at the first odometer value if the current odometer value indicates no change from the first odometer value.

According to another exemplary aspect, a computer-readable medium (e.g., a storage medium or other suitable non-transitory medium) may have computer-executable instructions recorded thereon, wherein executing the computer-executable instructions on one or more processors (e.g., processors on a navigation unit, a mobile device, a server, or another suitable apparatus) may cause the one or more processors to estimate an initial position and navigation state associated with a vehicle. More particularly, in one embodiment, executing the computer-executable on the one or more processors may cause the one or more processors to store a last known position associated with the vehicle at a first odometer value in a memory, compare the first odometer value to a current odometer value associated with the vehicle in response to a mobile device establishing a link with the vehicle, and use the last known position at the first odometer value to estimate the initial position and navigation state associated with the vehicle based on a difference between the first odometer value and the current odometer value. For example, if the current odometer value indicates no change from the first odometer value, the estimated initial position may substantially correspond to the last known position at the first odometer value. Furthermore, in one embodiment, executing the computer-executable instructions on the one or more processors may further cause the one or more processors to store a last known heading associated with the vehicle at the first odometer value in the memory, wherein the estimated initial navigation state may comprise the last known heading at the first odometer value if the current odometer value indicates no change from the first odometer value.

Other objects and advantages associated with the mechanisms disclosed herein to initialize a position and navigation state using odometry and proximity described herein will be apparent to those skilled in the art based on the accompanying drawings and detailed description.

BRIEF DESCRIPTION OF THE DRAWINGS

A more complete appreciation of aspects of the disclosure and many of the attendant advantages thereof will be readily obtained as the same becomes better understood by reference to the following detailed description when considered in connection with the accompanying drawings which are presented solely for illustration and not limitation of the disclosure, and in which.

DETAILED DESCRIPTION

Various aspects are disclosed in the following description and related drawings. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

The terminology used herein is for the purpose of describing particular embodiments only and not to limit any embodiments disclosed herein. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many aspects are described in terms of sequences of actions to be performed by, for example, elements of a computing device. It will be recognized that various actions described herein can be performed by specific circuits (e.g., an application specific integrated circuit (ASIC)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

Figure 1:
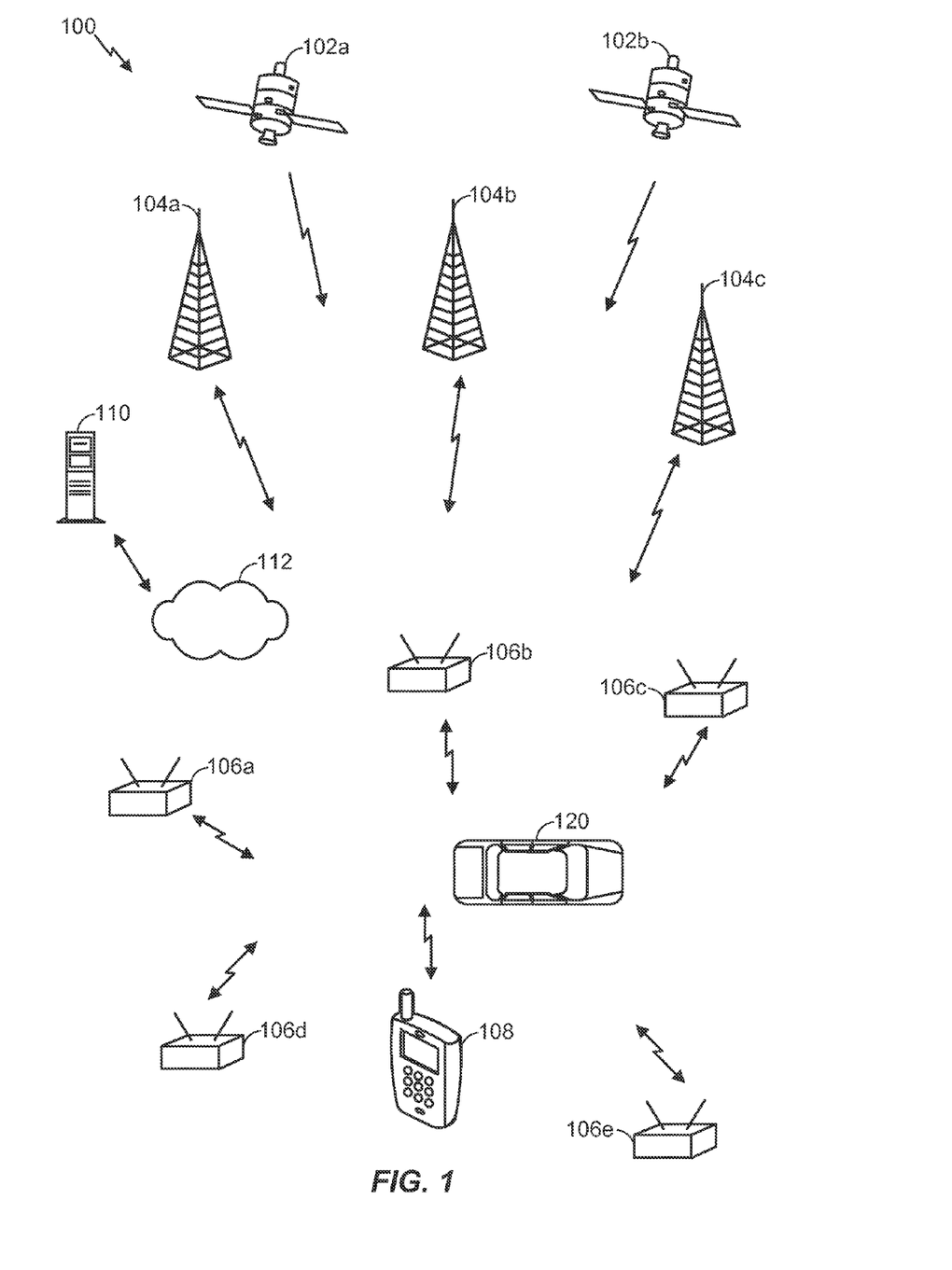
FIG. 1 illustrates an exemplary operating environment for a mobile device that can determine position using wireless techniques, according to one aspect of the disclosure.

According to one aspect of the disclosure, FIG. 1 illustrates an exemplary operating environment 100 for a mobile device 108 having wireless positioning capability. Embodiments are directed to a mobile device 108 which may determine its position based upon round trip time (RTT) measurements that are adjusted to accommodate for processing delays introduced by wireless access points. The processing delays may vary among different access points and may also change over time. By using information from a motion sensor, the mobile device 108 may calibrate out the effects of the processing delays introduced by the wireless access points.

The operating environment 100 may contain one or more different types of wireless communication systems and/or wireless positioning systems. In the embodiment shown in FIG. 1, one or more Satellite Positioning System (SPS) satellites 102a, 102b may be used as an independent source of position information for the mobile device 108. The mobile device 108 may include one or more dedicated SPS receivers specifically designed to receive signals for deriving geo-location information from the SPS satellites.

The operating environment 100 may also include one or more Wide Area Network Wireless Access Points (WAN-WAPs) 104a, 104b, 104c, which may be used for wireless voice and/or data communication, and as another source of independent position information for the mobile device 108. The WAN-WAPs 104a-104c may be part of a wide area wireless network (WWAN), which may include cellular base stations at known locations, and/or other wide area wireless systems, such as, for example, Worldwide Interoperability for Microwave Access (WiMAX) (e.g., IEEE 802.16). The WWAN may include other known network components which are not shown in FIG. 1 for simplicity. Typically, each of the WAN-WAPs 104a-104c within the WWAN may operate from fixed positions, and provide network coverage over large metropolitan and/or regional areas.

The operating environment 100 may further include one or more Local Area Network Wireless Access Points (LAN-WAPs) 106a, 106b, 106c, 106d, 106e, which may be used for wireless voice and/or data communication, as well as another independent source of position data. The LAN-WAPs can be part of a Wireless Local Area Network (WLAN), which may operate in buildings and perform communications over smaller geographic regions than a WWAN. Such LAN-WAPs 106a-106e may be part of, for example, Wi-Fi networks (802.11x), cellular piconets and/or femtocells, Bluetooth networks, etc.

The mobile device 108 may derive position information from any one or more of the SPS satellites 102a, 102b, the WAN-WAPs 104a-104c, and/or the LAN-WAPs 106a-106e. Each of the aforementioned systems can provide an independent estimate of the position for the mobile device 108 using different techniques. In some embodiments, the mobile device 108 may combine the solutions derived from each of the different types of access points to improve the accuracy of the position data. When deriving position using the SPS satellites 102a, 102b, the mobile device 108 may utilize a receiver specifically designed for use with the SPS that extracts position, using conventional techniques, from a plurality of signals transmitted by SPS satellites 102a, 102b.

A satellite positioning system (SPS) typically includes a system of transmitters positioned to enable entities to determine their location on or above the Earth based, at least in part, on signals received from the transmitters. Such a transmitter typically transmits a signal marked with a repeating pseudo-random noise (PN) code of a set number of chips and may be located on ground-based control stations, user equipment and/or space vehicles. In a particular example, such transmitters may be located on Earth orbiting satellite vehicles (SVs). For example, a SV in a constellation of Global Navigation Satellite System (GNSS) such as Global Positioning System (GPS), Galileo, Glonass or Compass may transmit a signal marked with a PN code that is distinguishable from PN codes transmitted by other SVs in the constellation (e.g., using different PN codes for each satellite as in GPS or using the same code on different frequencies as in Glonass). In accordance with certain aspects, the techniques presented herein are not restricted to global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, Beidou over China, etc., and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

Furthermore, the disclosed method and apparatus may be used with positioning determination systems that utilize pseudolites or a combination of satellites and pseudolites. Pseudolites are ground-based transmitters that broadcast a PN code or other ranging code (similar to a GPS or CDMA cellular signal) modulated on an L-band (or other frequency) carrier signal, which may be synchronized with GPS time. Each such transmitter may be assigned a unique PN code so as to permit identification by a remote receiver. Pseudolites are useful in situations where GPS signals from an orbiting satellite might be unavailable, such as in tunnels, mines, buildings, urban canyons or other enclosed areas. Another implementation of pseudolites is known as radio-beacons. The term "satellite", as used herein, is intended to include pseudolites, equivalents of pseudolites, and possibly others. The term "SPS signals," as used herein, is intended to include SPS-like signals from pseudolites or equivalents of pseudolites.

When deriving position from the WWAN, each WAN-WAPs 104a-104c may take the form of base stations within a digital cellular network, and the mobile device 108 may include a cellular transceiver and processor that can exploit the base station signals to derive position. Such cellular networks may include, but are not limited to, standards in accordance with GSM, CMDA, 2G, 3G, 4G, LTE, etc. It should be understood that digital cellular network may include additional base stations or other resources that may not be shown in FIG. 1. While WAN-WAPs 104a-104c may actually be moveable or otherwise capable of being relocated, for illustration purposes it will be assumed that they are essentially arranged in a fixed position.

The mobile device 108 may perform position determination using known time-of-arrival (TOA) techniques such as, for example, Advanced Forward Link Trilateration (AFLT). In other embodiments, each WAN-WAP 104a-104c may comprise a WiMAX wireless networking base station. In this case, the mobile device 108 may determine its position using TOA techniques from signals provided by the WAN-WAPs 104a-104c. The mobile device 108 may determine positions either in a stand-alone mode, or using the assistance of a positioning server 110 and network 112 using TOA techniques, as will be described in more detail below. Furthermore, various embodiments may have the mobile device 108 determine position information using WAN-WAPs 104a-104c, which may have different types. For example, some WAN-WAPs 104a-104c may be cellular base stations, and other WAN-WAPs 104a-104c may be WiMAX base stations. In such an operating environment, the mobile device 108 may be able to exploit the signals from each different type of WAN-WAP 104a-104c, and further combine the derived position solutions to improve accuracy.

When deriving position using the WLAN, the mobile device 108 may utilize TOA techniques with the assistance of the positioning server 110 and the network 112. The positioning server 110 may communicate to the mobile device 108 through network 112. Network 112 may include a combination of wired and wireless networks which incorporate the LAN-WAPs 106a-106e. In one embodiment, each LAN-WAP 106a-106e may be, for example, a Wi-Fi wireless access point, which is not necessarily set in a fixed position and can change location. The position of each LAN-WAP 106a-106e may be stored in the positioning server 110 in a common coordinate system. In one embodiment, the position of the mobile device 108 may be determined by having the mobile device 108 receive signals from each LAN-WAP 106a-106e. Each signal may be associated with its originating LAN-WAP based upon some form of identifying information that may be included in the received signal (such as, for example, a MAC address). The mobile device 108 may then sort the received signals based upon signal strength, and derive the time delays associated with each of the sorted received signals. The mobile device 108 may then form a message which can include the time delays and the identifying information of each of the LAN-WAPs, and send the message via network 112 to the positioning sever 110. Based upon the received message, the positioning server 110 may then determine a position, using the stored locations of the relevant LAN-WAPs 106a-106e, of the mobile device 108. The positioning server 110 may generate and provide a Location Configuration Indication (LCI) message to the mobile device 108 that includes a pointer to the position of the mobile device 108 in a local coordinate system. The LCI message may also include other points of interest in relation to the location of the mobile device 108. When computing the position of the mobile device 108, the positioning server 110 may take into account the different delays which can be introduced by elements within the wireless network.

The position determination techniques described herein may be used for various wireless communication networks such as a WWAN, a WLAN, a wireless personal area network (WPAN), and so on. The term "network" and "system" may be used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC- FDMA) network, a WiMAX (IEEE 802.16) network, and so on. A CDMA network may implement one or more radio access technologies (RATs) such as cdma2000, Wideband-CDMA (W-CDMA), and so on. cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be used for any combination of a WWAN, WLAN and/or WPAN.

Furthermore, in one embodiment, the mobile device 108 may be suitably linked to a vehicle 120 through one or more communication interfaces (e.g., a Bluetooth interface, an RF antenna, a wired connection, etc.) that enable the mobile device 108 to read an odometer value and other vehicle odometry and inertial sensor (VOIS) measurements from the vehicle 120. For example, as will be described in further detail below, the mobile device 108 may use the odometer value read from the vehicle 120 (e.g., a cumulative odometer value stored on the vehicle 120 via electronic, mechanical, or other means) to determine changes in distance and reveal the total distance traveled in the vehicle 120, which may be used to quickly initialize various parameters that may be used to derive an estimated initial position, velocity, and heading that can be used to support navigation in the vehicle 120. Furthermore, an application program interface (API) that supports communication between the mobile device 108 and the vehicle 120 may make the odometer value available to the mobile device 108 even if the vehicle 120 has been shut off and left for a substantial time period. Accordingly, the mobile device 108 may store an association between the last known position and navigation state associated with the vehicle 120 at a given odometer value (e.g., at the last time that the mobile device 108 was linked to the vehicle 120), or the mobile device 108 may alternatively obtain the last known position and navigation state associated with the odometer value from the positioning server 110 or another suitable device or database that stores the association, wherein the mobile device 108 may then use the last known position and navigation state to estimate an initial position and navigation state associated with the vehicle 120.

Figure 2:
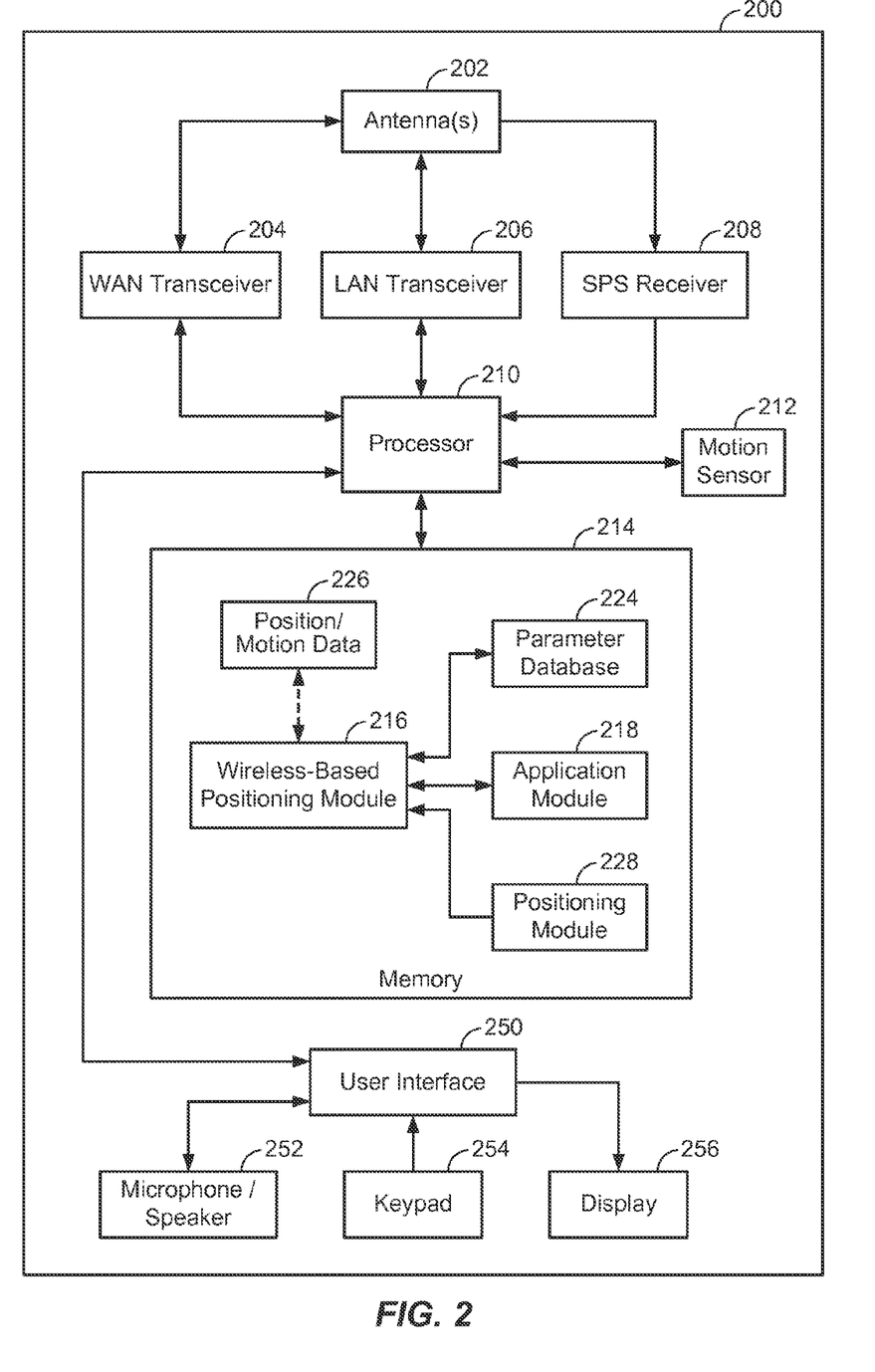
FIG. 2 illustrates an exemplary mobile device that may be used in an operating environment that can determine position using wireless techniques, according to one aspect of the disclosure.

FIG. 2 is a block diagram illustrating various components of an exemplary mobile device 200. For the sake of simplicity, the various features and functions illustrated in the box diagram of FIG. 2 are connected together using a common bus which is meant to represent that these various features and functions are operatively coupled together. Those skilled in the art will recognize that other connections, mechanisms, features, functions, or the like, may be provided and adapted as necessary to operatively couple and configure an actual portable wireless device. Further, it is also recognized that one or more of the features or functions illustrated in the example of FIG. 2 may be further subdivided or two or more of the features or functions illustrated in FIG. 2 may be combined.

The mobile device 200 may include one or more wide area network (WAN) transceiver(s) 204 that may be connected to one or more antennas 202. The WAN transceiver 204 comprises suitable devices, hardware, and/or software for communicating with and/or detecting signals to/from WAN-WAPs 104a-104c, and/or directly with other wireless devices within a network. In one aspect, the WAN transceiver 204 may comprise a CDMA communication system suitable for communicating with a CDMA network of wireless base stations; however in other aspects, the wireless communication system may comprise another type of cellular telephony network, such as, for example, TDMA or GSM. Additionally, any other type of wide area wireless networking technologies may be used, for example, WiMAX (IEEE 802.16), etc. The mobile device 200 may also include one or more local area network (LAN) transceivers 206 that may be connected to one or more antennas 202. The LAN transceiver 206 comprises suitable devices, hardware, and/or software for communicating with and/or detecting signals to/from LAN-WAPs 106a-106e, and/or directly with other wireless devices within a network. In one aspect, the LAN transceiver 206 may comprise a Wi-Fi (802.11x) communication system suitable for communicating with one or more wireless access points; however in other aspects, the LAN transceiver 206 comprise another type of local area network, personal area network, (e.g., Bluetooth). Additionally, any other type of wireless networking technologies may be used, for example, Ultra Wide Band, ZigBee, wireless USB etc.

As used herein, the abbreviated term "wireless access point" (WAP) may be used to refer to LAN-WAPs 106a-106e and/or WAN-WAPs 104a-104c. Specifically, in the description presented below, when the term "WAP" is used, it should be understood that embodiments may include a mobile device 200 that can exploit signals from a plurality of LAN-WAPs 106a-106e, a plurality of WAN-WAPs 104a-104c, or any combination of the two. The specific type of WAP being utilized by the mobile device 200 may depend upon the environment of operation. Moreover, the mobile device 200 may dynamically select between the various types of WAPs in order to arrive at an accurate position solution. In other embodiments, various network elements may operate in a peer-to-peer manner, whereby, for example, the mobile device 200 may be replaced with the WAP, or vice versa. Other peer-to-peer embodiments may include another mobile device (not shown) acting in place of one or more WAP.

An SPS receiver 208 may also be included in the mobile device 200. The SPS receiver 208 may be connected to the one or more antennas 202 for receiving satellite signals. The SPS receiver 208 may comprise any suitable hardware and/or software for receiving and processing SPS signals. The SPS receiver 208 requests information and operations as appropriate from the other systems, and performs the calculations necessary to determine the mobile device's 200 position using measurements obtained by any suitable SPS algorithm.

A motion sensor 212 may be coupled to a processor 210 to provide movement and/or orientation information which is independent of motion data derived from signals received by the WAN transceiver 204, the LAN transceiver 206 and the SPS receiver 208.

By way of example, the motion sensor 212 may utilize an accelerometer (e.g., a MEMS device), a gyroscope, a geomagnetic sensor (e.g., a compass), an altimeter (e.g., a barometric pressure altimeter), and/or any other type of movement detection sensor. Moreover, the motion sensor 212 may include a plurality of different types of devices and combine their outputs in order to provide motion information. For example, the motion sensor 212 may use a combination of a multi-axis accelerometer and orientation sensors to provide the ability to compute positions in 2-D and/or 3-D coordinate systems.

The processor 210 may be connected to the WAN transceiver 204, LAN transceiver 206, the SPS receiver 208 and the motion sensor 212. The processor 210 may include one or more microprocessors, microcontrollers, and/or digital signal processors that provide processing functions, as well as other calculation and control functionality. The processor 210 may also include memory 214 for storing data and software instructions for executing programmed functionality within the mobile device 200. The memory 214 may be on-board the processor 210 (e.g., within the same IC package), and/or the memory may be external memory to the processor and functionally coupled over a data bus. The functional details associated with aspects of the disclosure will be discussed in more detail below.

A number of software modules and data tables may reside in memory 214 and be utilized by the processor 210 in order to manage both communications and positioning determination functionality. As illustrated in FIG. 2, memory 214 may include and/or otherwise receive a wireless-based positioning module 216, an application module 218, and a positioning module 228. One should appreciate that the organization of the memory contents as shown in FIG. 2 is merely exemplary, and as such the functionality of the modules and/or data structures may be combined, separated, and/or be structured in different ways depending upon the implementation of the mobile device 200.

The application module 218 may be a process running on the processor 210 of the mobile device 200, which requests position information from the wireless-based positioning module 216. Applications typically run within an upper layer of the software architectures, and may include Indoor Navigation, Buddy Locator, Shopping and Coupons, Asset Tracking, and location Aware Service Discovery. The wireless-based positioning module 216 may derive the position of the mobile device 200 using information derived from time information measured from signals exchanged with a plurality of WAPs. In order to accurately determine position using time-based techniques, reasonable estimates of time delays, introduced by the processing time of each WAP, may be used to calibrate/adjust the time measurements obtained from the signals. As used herein, these time delays are referred to as "processing delays."

Calibration to further refine the processing delays of the WAPs may be performed using information obtained by the motion sensor 212. In one embodiment, the motion sensor 212 may directly provide position and/or orientation data to the processor 210, which may be stored in memory 214 in the position/motion data module 226. In other embodiments, the motion sensor 212 may provide data which should be further processed by processor 210 to derive information to perform the calibration. For example, the motion sensor 212 may provide acceleration and/or orientation data (single or multi-axis) which can be processed using positioning module 228 to derive position data for adjusting the processing delays in the wireless-based positioning module 216.

After calibration, the position may then be output to the application module 218 in response to its aforementioned request. In addition, the wireless-based positioning module 216 may utilize a parameter database 224 for exchanging operational parameters. Such parameters may include the determined processing delays for each WAP, the WAPs positions in a common coordinate frame, various parameters associated with the network, initial processing delay estimates, etc.

In other embodiments, the additional information may optionally include auxiliary position and/or motion data which may be determined from other sources besides the motion sensor 212, such as, for example, from SPS measurements. The auxiliary position data may be intermittent and/or noisy, but may be useful as another source of independent information for estimating the processing delays of the WAPs depending upon the environment in which the mobile device 200 operates.

For example, in some embodiments, data derived from the SPS receiver 208 may supplement the position data supplied by the motion sensor 212 (either directly from the position/motion data module 226 or derived by the positioning module 228). In other embodiments, the position data may be combined with data determined through additional networks using non-RTT techniques (e.g., AFLT within a CDMA network). In certain implementations, the motion sensor 212 and/or the SPS receiver 208 may provide all or part of the auxiliary position/motion data 226 without further processing by the processor 210. In some embodiments, the auxiliary position/motion data 226 may be directly provided by the motion sensor 212 and/or the SPS receiver 208 to the processor 210.

While the modules shown in FIG. 2 are illustrated in the example as being contained in the memory 214, it is recognized that in certain implementations such procedures may be provided for or otherwise operatively arranged using other or additional mechanisms. For example, all or part of the wireless-based positioning module 216 and/or the application module 218 may be provided in firmware. Additionally, while in this example the wireless-based positioning module 216 and the application module 218 are illustrated as being separate features, it is recognized, for example, that such procedures may be combined together as one procedure or perhaps with other procedures, or otherwise further divided into a plurality of sub-procedures.

The processor 210 may include any form of logic suitable for performing at least the techniques provided herein. For example, the processor 210 may be operatively configurable based on instructions in the memory 214 to selectively initiate one or more routines that exploit motion data for use in other portions of the mobile device.

The mobile device 200 may include a user interface 250 which provides any suitable interface systems, such as a microphone/speaker 252, keypad 254, and display 256 that allows user interaction with the mobile device 200. The microphone/speaker 252 provides for voice communication services using the WAN transceiver 204 and/or the LAN transceiver 206. The keypad 254 comprises any suitable buttons for user input. The display 256 comprises any suitable display, such as, for example, a backlit LCD display, and may further include a touch screen display for additional user input modes.

As used herein, the mobile device 108 and/or mobile device 200 may be any portable or movable device or machine that is configurable to acquire wireless signals transmitted from, and transmit wireless signals to, one or more wireless communication devices or networks. As shown in FIG. 1 and FIG. 2, the mobile device 108 and/or mobile device 200 is representative of such a portable wireless device. Thus, by way of example but not limitation, the mobile device 108 may include a radio device, a cellular telephone device, a computing device, a personal communication system (PCS) device, or other like movable wireless communication equipped device, appliance, or machine. The term "mobile device" is also intended to include devices which communicate with a personal navigation device (PND), such as by short-range wireless, infrared, wire line connection, or other connection, regardless of whether satellite signal reception, assistance data reception, and/or position-related processing occurs at the device or at the PND. Also, "mobile device" is intended to include all devices, including wireless devices, computers, laptops, etc. which are capable of communication with a server, such as via the Internet, Wi-Fi, or other network, and regardless of whether satellite signal reception, assistance data reception, and/or position-related processing occurs at the device, at a server, or at another device associated with the network. Any operable combination of the above is also considered a "mobile device."

As used herein, the term "wireless device" may refer to any type of wireless communication device which may transfer information over a network and also have position determination and/or navigation functionality. The wireless device may be any cellular mobile terminal, personal communication system (PCS) device, personal navigation device, laptop, personal digital assistant, or any other suitable mobile device capable of receiving and processing network and/or SPS signals.

Figure 3:
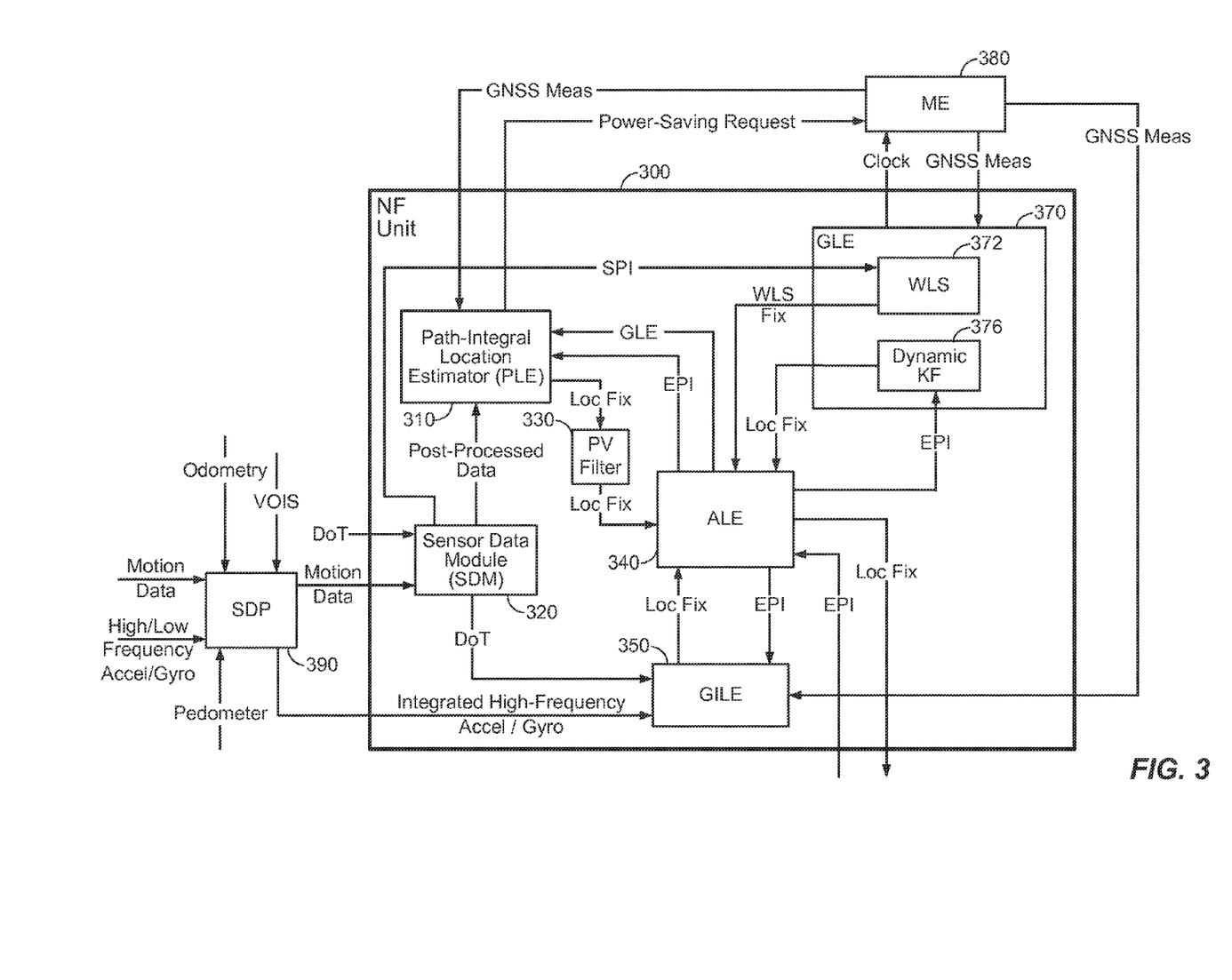
FIG. 3 illustrates an exemplary sensor-assisted navigation system that may be used to initialize a navigation position and state, according to one aspect of the disclosure.

According to one aspect of the disclosure, FIG. 3 illustrates an exemplary sensor-assisted navigation (SAN) system that may be used to initialize a navigation position and state, wherein the SAN system shown therein may generally include a navigation fix (NF) unit 300, a measurement engine (ME) 380 that may communicate with the NF unit 300, and a sensor data processor (SDP) 390 that may further communicate with the NF unit 300. In one embodiment, the NF unit 300 may be a composite of several location estimators, which may include a path-integral location estimator (PLE) 310, a sensor data module (SDM) 320, a position velocity (PV) filter 330 (e.g., a cascade filter that may be applied to position, velocity, and/or other location fix outputs from the PLE 310 to further refine and smooth a navigation result), an aggregator location estimator (ALE) 340, a GNSS inertial navigation system (GNSS-INS) location estimator (GILE) 350, and a GNSS location estimator (GLE) 370.

As shown in FIG. 3, the SDP 390 may communicate with the outside world and receive sensor and other data (e.g., telematics sourced from a vehicle). For example, in one embodiment, the SDP 390 may receive VOIS measurements, motion data, high and low frequency accelerometer and gyroscope signals, pedometer signals, telematics data, or other suitable sensor data and provide a "front-end" to the NF unit 300. Furthermore, the SDP 390 may establish time synchronization between incoming data and GPS time and then assign GPS timestamps to the incoming data, which may comprise direction of travel (DoT) data and motion data that the SDP 390 forwards to the SDM 320 for storage and processing and/or integrated high frequency accelerometer and gyroscope data that the SDP 390 forwards to the GILE 350 for storage and processing. The SDM 320 receives the timestamped data from the SDP 390, computes derived quantities, and buffers and distributes such data inside the NF unit 300 (e.g., to the GLE 370, the PLE 310, the GILE 350, etc.).

For example, as further shown in FIG. 3, the SDM 320 may distribute post-processed data to the PLE 310, which may use the post-processed data in combination with GNSS measurements received from the ME 380 and GLE and External Position Injection (EPI) data received from the ALE 340 to compute a location fix. The PLE 310 may provide the location fix to the PV filter 330, which may apply the cascade filter mentioned above to refine the location fix computed in the PLE 310 and then provide the refined location fix to the ALE 340. Furthermore, the SDM 320 may provide a Stationary Position Indicator (SPI) to the GLE 370, which may include a weighted least squares (WLS) module 372 that may use the SPI in combination with GNSS measurements received from the ME 380 to compute a WLS fix that may be back to the ALE 340 and used to perform a divergence check associated with the location fix computed in the PLE 310 based on the refined location fix received from the PV filter 330. For example, in one embodiment, the divergence check may include the PLE 310 obtaining the WLS fix for a current epoch from the ALE 340 and comparing the WLS fix for the current epoch to the location fix produced therein. As such, in response to detecting a divergence between the WLS fix obtained from the ALE 340 and the location fix produced in the PLE 310, the divergence check may result in resetting the PLE 310 to an uninitialized state. In addition, the GLE 370 may include a dynamic Kalman Filter (KF) 376 that may receive the EPI data from the ALE 340 and compute a location fix that may be used an input to the ALE 340 to support detecting a stationary or non-stationary user and/or to perform a second divergence check. For example, in one embodiment, the second divergence check may compare the location fix received from the PLE 310 (via the PV filter 330) with the location fix received from the dynamic KF 376 in the GLE 370 to detect divergence associated with the location fix computed in the PLE 310, wherein if the ALE 340 detects a divergence between the location fix computed in the PLE 310 and the location fix that the dynamic KF filter 376 computed, the ALE 340 may reset the PLE 310 to the location fix computed with the dynamic KF 376 in the GLE 370.

In one embodiment, the SAN system may further support dead reckoning techniques to advance a previous location fix (e.g., a previous location fix output from the ALE 340) according to known or estimated velocities and headings using data obtained from inertial sensors (e.g., the DoT, motion data, and integrated high-frequency accelerometer and gyroscope data output from the SDP 390). As such, the dead reckoning techniques may generally advance the previous location fix to calculate a current position and heading that support navigation from the previous location fix. However, suitably performing dead reckoning at start-up may be difficult because there may not be a previous location fix that can be advanced to determine an initial position until sufficient GNSS signals have been acquired, and furthermore, inertial sensor data or other motion data may not be available to derive estimated velocities and headings because the vehicle will not be moving at start-up. Accordingly, the following description will detail how the SAN system shown in FIG. 3 may precisely estimate an initial position and navigation state using vehicle odometry, modeled vehicle dynamics, or other suitable vehicle parameters to support dead reckoning at start-up based on a last known vehicle position, which may assist mechanisms that the SAN system uses to acquire GNSS signals, create pseudo ranges from code phase values, linearize a first GNSS position, and provide the appearance of an always-available position to the user.

For example, in one embodiment, the SAN system may be suitably linked to a vehicle through one or more communication interfaces (e.g., a Bluetooth interface, an RF antenna, a wired connection, etc.) that enable the SDP 390 to read an odometer value and other VOIS measurements from the vehicle, wherein the odometer value read from the vehicle may generally comprise a cumulative odometer value that the vehicle stores or otherwise makes available via electronic, mechanical, or other means. In general, the vehicle odometer value may be used to determine changes in distance and reveal the total distance traveled in the vehicle, which may be used to quickly initialize various parameters that one or more filters in the NF unit 300 may use to derive an estimated position, velocity, and heading that can be used to support navigation. Furthermore, an API that supports communication between the SDP 390 and the vehicle may make the vehicle odometer value available to the SAN system even if the vehicle has been shut off and left for a substantial time period. Accordingly, the SDP 390 may store an association between the last known position and navigation state associated with the vehicle at a given odometer value (e.g., at the last time that the SAN system was linked to the vehicle), or the SDP 390 may alternatively obtain the last known position and navigation state associated with the odometer value from a server or another database, wherein the last known position and navigation state may then be used to estimate an initial position and navigation state associated with the vehicle.

For example, in one embodiment, a key to the database may be an identifier associated with the vehicle, which may be associated with the last known position, the odometer value and a last known heading at the time that the last known position was determined, or any other suitable data that may be relevant to establishing an initial position and navigation state. For example, in one embodiment, the SAN system may further store various sensor error models (e.g., a last known sensor bias, an odometry scale factor, and an estimated lever arm that represents an offset or displacement between the SAN system and a reference body based on where a user places the SAN system in the vehicle) and vehicle dynamics models (e.g., turning rate statistics, velocity statistics, or other driving pattern statistics) that may contribute to dead reckoning at start-up. Furthermore, in one embodiment, the vehicle and/or a navigation unit (e.g., a mobile device) that incorporates the SAN system may assume a beacon role (e.g., a wireless access point, cellular base station, etc.), in that the vehicle and/or a navigation unit may share the information about the last known position, last known heading, or other navigation state information relating to the vehicle. In this manner, a user could distribute the position and navigation state information among multiple different devices, transfer the position and navigation state information to another user's mobile device (e.g., someone who may be borrowing the vehicle), and/or use a device that does not support GPS or GNSS technology to perform dead reckoning.

More particularly, after a user disconnects the navigation unit that incorporates the SAN system (e.g., the mobile device) from the vehicle and subsequently returns to the vehicle with the navigation unit, the odometer value at the time that the last known vehicle position was determined may be compared to the current odometer value. As such, if the current odometer value has not changed from the odometer value when the last known position associated with the vehicle was determined, the initial position estimate may be restored from the last known position at that odometer value and an initial navigation state (e.g., heading) may be restored from the last known heading at that odometer value, which may produce an initial position and heading error that can be assumed to be as good as the last computed position and heading error because an odometer reading indicating no change may be assumed to mean that the vehicle has not moved. However, those skilled in the art will appreciate that in certain cases the vehicle may have moved despite no change in the odometer reading (e.g., if the vehicle was taken on a ferry). In this regard, the SAN system may perform an additional check at start-up based on the sensor error models, vehicle dynamic models, or other suitable data (e.g., GNSS signals if available) to determine whether the vehicle has substantially changed positions, in which case the mechanisms to estimate the initial position estimate and navigation state may be disabled to avoid using incorrect measurements at start-up. Furthermore, in certain cases, if the current odometer value has changed from the odometer value when the last known vehicle position was determined, the change in odometer value may provide a limit on the likely distance from the last known position that can be used for the initial position estimate.

Figure 4:
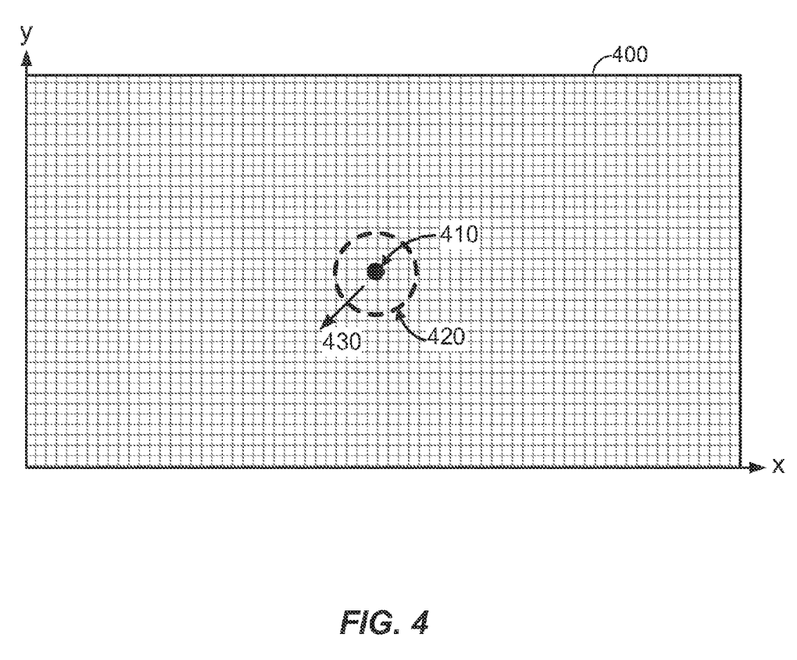
FIG. 4 illustrates an exemplary initialized position and navigation state that may be achieved with the mechanisms described herein, according to one aspect of the disclosure.

For example, with reference to FIG. 4, an exemplary initialized position and navigation state that may be achieved with the mechanisms described above may be provided. As shown in FIG. 4, a geographical area 400 may be represented in Cartesian coordinates with an x-axis and a y-axis, which may pertain to an indoor location where GPS and/or GNSS signals may be unavailable. However, those skilled in the art will appreciate that the geographical area 400 shown in FIG. 4 may represent any suitable location, whether indoors or outdoors, as the position and navigation state initialization mechanisms described above may advantageously contribute to dead reckoning in any environment (e.g., because GPS and/or GNSS sensors typically experience a delay before sufficient signals are received to compute an initial position and the vehicle must begin to move before any inertial sensors can determine a heading from vehicle velocities or other dynamics). In the example shown in FIG. 4, the navigation unit described above may generally obtain a last known position, heading, sensor errors, and other information relating to a navigation state associated with the vehicle at a given odometer value, wherein the last known position may be represented with point 410 in area 400.

When the user subsequently returns to the vehicle, the navigation unit may compare the current odometer value to the odometer value at the time that the last known vehicle position 410 was determined, whereby a current initial position estimate may substantially correspond to the last known vehicle position 410 if the odometer value has not changed. Furthermore, the navigation unit may restore a current heading or other initial navigation state from a last known heading 430 if the current odometer reading indicates no change. As such, having the initial position estimate 410 and the initial heading 430 available, known vehicle dynamics models (e.g., velocity statistics, turning rate statistics, driving habit statistics, etc.) may be used to perform dead reckoning at start-up and thereby provide a "hot" start on navigation until GPS and/or GNSS signals can be suitably acquired.

Furthermore, even if the current odometer value has changed from the odometer value when the last known vehicle position 410 was determined, the change in odometer value may provide a limit on the likely distance from the last known position 410 that can be used for the initial position estimate. For example, as shown in FIG. 4, the change in odometer value may provide a radius that limits the likely distance from the last known position 410 to the circle represented with the dashed circle 420 and estimated errors may be appropriately scaled according to the change in odometry. In this manner, even if the initial position estimate and heading cannot be completely restored from the last known position 410 and the last known heading 430, limiting the initial position associated with the vehicle to the area inside circle 420 may substantially reduce the time needed to acquire suitable GPS and/or GNSS signals, create pseudo ranges from code phase values, linearize a first GPS and/or GNSS position, provide an always-available position to the user, or otherwise support dead reckoning at start-up. However, those skilled in the art will appreciate that if the change in odometer value is sufficiently high, the estimated error may be too large to provide a reasonable limit on the initial position estimate. In these scenarios, the navigation unit may attempt to acquire a last known position or heading from a built-in navigation unit associated with the vehicle (if available) or wait until GPS and/or GNSS signals can be suitably acquired to establish the initial position and sufficient movement has occurred to derive the initial heading or other navigation state.

Figure 5:
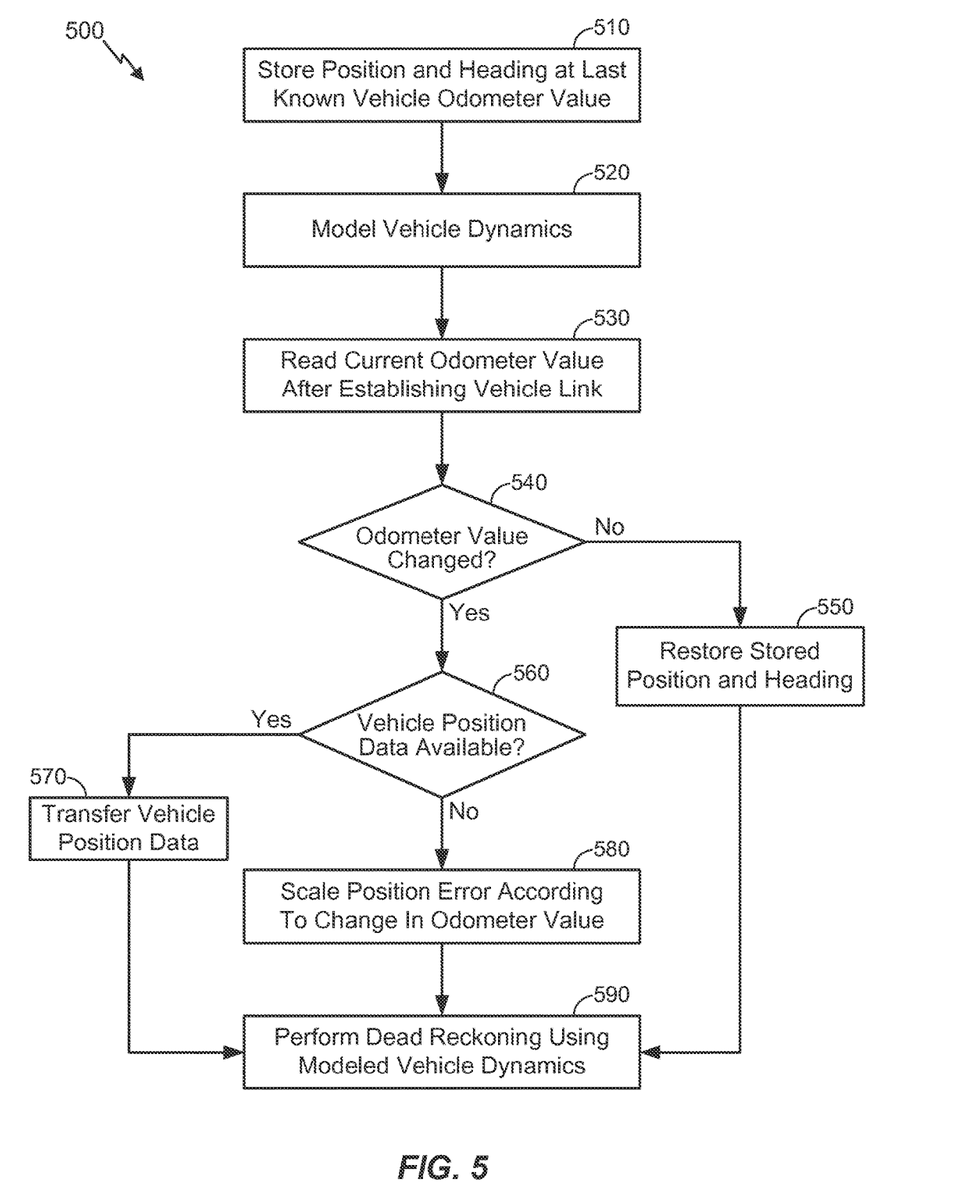
FIG. 5 illustrates an exemplary method that may initialize a navigation position and state, according to one aspect of the disclosure.

According to one aspect of the disclosure, FIG. 5 illustrates an exemplary method 500 that may initialize a navigation position and state. In particular, a navigation unit (e.g., a mobile device) may be suitably linked to a vehicle through one or more communication interfaces that enable the navigation unit to read an odometer value and other VOIS measurements from the vehicle. In general, the vehicle odometer value may be used to determine change in distance and reveal the total distance traveled in the vehicle, which may be used to quickly initialize one or more filters in the navigation unit with various parameters that may be used to derive position, velocity, and heading information used to support navigation. Accordingly, the navigation unit may initially store an association between the last known position, heading, or other navigation state information associated with the vehicle at a given odometer value at block 510 from the last time that the navigation unit was linked to the vehicle. Furthermore, in one embodiment, the last known position and odometer value may be indexed according to a suitable identifier (e.g., an identifier associated with the vehicle, such that the navigation unit may be used to initialize a position and navigation state in multiple vehicles).

In one embodiment, the navigation unit may further store various dynamics associated with the vehicle at block 520, wherein the dynamics may include sensor error models (e.g., a last known sensor bias, an odometry scale factor, and an estimated lever arm, etc.) and vehicle motion models (e.g., turning rate statistics, velocity statistics, or other driving pattern statistics), which may contribute to dead reckoning at start-up. Accordingly, after a user disconnects the navigation unit from the vehicle and subsequently establishes a link between the navigation unit and the vehicle (e.g., after returning to the vehicle), the navigation unit may read the current vehicle odometry at block 530. The current vehicle odometry may then be compared to the odometer value at the time that the last known vehicle position was determined at block 540, wherein if the current odometer value has not changed from the odometer value when the last known position associated with the vehicle was determined, the initial position estimate and heading may be restored from the last known position and heading at that odometer value at block 550, which may produce an initial position and heading error that can be assumed to be as good as the last computed position and heading error because an odometer reading indicating no change may be assumed to mean that the vehicle has not moved.

However, in one embodiment, block 540 may include an additional check based on the dynamics modeled at block 520 to determine whether the vehicle has substantially changed position despite no change in the odometer reading (e.g., if the vehicle was taken on a ferry), in which case the method would proceed to block 560. Alternatively, the method may proceed to block 560 if the current odometer value has changed from the odometer value when the last known vehicle position was determined. In either case, the navigation unit may determine whether position data, heading data, or any other suitable navigation and/or odometry measurement data may be available through the vehicle (e.g., position fixes, heading determinations, or other navigation data that another mobile device calculated, that a built-in navigation unit calculated, etc.). As such, in response to determining that the vehicle has available position data, heading data, or other suitable navigation and/or odometry measurement data, the navigation unit may then transfer the last known position, heading, or other available navigation data from the vehicle at block 570. Otherwise, if the vehicle does not have position data, heading data, or other suitable navigation data available, any change in odometer value determined at block 540 may provide a limit on the likely distance from the last known position that can be used for the initial position estimate and the estimated error associated with the initial position estimate may be scaled according to the change in odometry at block 580.

In one embodiment, having obtained the initial position estimate and the initial heading, whether from the last known position and heading if the odometer value has not changed, from the vehicle, or based on GPS and/or GNSS signals that provide a position with an estimated error scaled according to the change in odometry, the modeled vehicle dynamics may be used at block 590 to perform dead reckoning at start-up and thereby provide a "hot" start on navigation until GPS and/or GNSS signals can be suitably acquired to verify or otherwise refine the estimated initial position and/or until sufficient vehicle movement can be detected to determine the vehicle heading. For example, velocity statistics, turning rate statistics, driving habit statistics, sensor error statistics, or other suitable parameters may be used at block 590 to advance any initial position estimate until sufficient GPS and/or GNSS signals and sufficient movement data have been acquired to begin normal operation.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the present disclosure.

The various illustrative logical blocks, modules, and circuits described in connection with the aspects disclosed herein may be implemented or performed with a general purpose processor, a DSP, an ASIC, an FPGA or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The methods, sequences and/or algorithms described in connection with the aspects disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in an IoT device. In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, DSL, or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes CD, laser disc, optical disc, DVD, floppy disk and Blu-ray disc where disks usually reproduce data magnetically and/or optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method for estimating at least an initial position of a mobile device using vehicle odometer readings, comprising:
    retrieving, by the mobile device, a last known position associated with a vehicle at a first odometer value associated with the vehicle in response to the mobile device establishing a link with the vehicle, wherein the last known position and the first odometer value associated with the vehicle are stored in association in a memory accessible to the mobile device;
    reading, by the mobile device, a current odometer value from the vehicle via the established link with the vehicle;
    comparing, by the mobile device, the first odometer value associated with the last known position to the current odometer value read from the vehicle; and
    using, by a navigation unit incorporated into the mobile device, the last known position associated with the vehicle at the first odometer value as the initial position of the mobile device at navigation start-up for subsequent positioning by the mobile device in response to the comparing indicating that the current odometer value has not changed from the first odometer value associated with the last known position, the mobile device including a receiver or transceiver to receive signals for deriving position information from the signals for aiding the subsequent positioning by the mobile device.

2. The method recited in claim 1, wherein the initial position of the mobile device has an estimated error that substantially corresponds to an estimated error associated with the last known position at the first odometer value in response to the comparing indicating that the current odometer value has not changed from the first odometer value.

3. The method recited in claim 2, further comprising:
    retrieving, from the memory, a last known heading associated with the vehicle at the first odometer value; and
    using, by the navigation unit incorporated into the mobile device, the last known heading at the first odometer value as an initial heading of the mobile device for the subsequent positioning by the mobile device in response to the comparing indicating that the current odometer value has not changed from the first odometer value.

4. The method recited in claim 3, wherein one or more of a server or the mobile device includes the memory that stores the last known position and the last known heading at the first odometer value.

5. The method recited in claim 1, further comprising defining a radius around the last known position in response to the comparing indicating a non-zero difference between the first odometer value and the current odometer value, wherein the defined radius limits a distance from the last known position that can be used for the subsequent positioning by the mobile device.

6. The method recited in claim 5, further comprising estimating, by the navigation unit incorporated into the mobile device, the initial position of the mobile device based on the defined radius in combination with one or more of data obtained from one or more satellites or data stored on the vehicle in response to the first odometer value and the current odometer value having a non-zero difference.

7. The method recited in claim 6, further comprising:
    scaling an estimated error associated with the initial position according to the difference between the first odometer value and the current odometer value; and determining whether to use the initial position or calculate a different initial position based on data from the one or more satellites based on the scaled estimated error.

8. The method recited in claim 1, wherein the memory further stores the last known position and the first odometer value associated with the vehicle in association with an identifier corresponding to the vehicle.

9. The method recited in claim 1, further comprising:
retrieving, by the mobile device, one or more models associated with the vehicle from the memory accessible to the mobile device; and
using, by the navigation unit incorporated into the mobile device, the one or more models associated with the vehicle to perform dead reckoning based on the initial position.

10. The method recited in claim 9, further comprising:
using the one or more models to determine whether a current position associated with the vehicle has substantially changed from the last known position despite the current odometer value indicating no change from the first odometer value; and
calculating, by the navigation unit incorporated into the mobile device, the initial position of the mobile device based on one or more of data from one or more satellites or data stored on the vehicle in response to the one or more models indicating that the current position associated with the vehicle has substantially changed from the last known position.

11. The method recited in claim 9, wherein the one or more models include parameters relating to one or more of a last known sensor bias, an odometry scale factor, an estimated lever arm, turning rate statistics, velocity statistics, or vehicle motion statistics.

12. The method recited in claim 1, wherein the mobile device assumes a beacon role to share at least the last known position at the first odometer value over one or more communication interfaces.

13. The method recited in claim 1, wherein the mobile device comprises a first mobile device, a server includes the memory that stores the last known position at the first odometer value, and the method further comprises:
retrieving, by the mobile device, the last known position from the server; and
transferring, by the first mobile device, the last known position retrieved from the server and a last known heading associated with the vehicle at the first odometer value to a second mobile device, wherein an estimated error associated with the last known position and the last known heading is based on a difference between the first odometer value and the current odometer value.

14. The method recited in claim 1, further comprising initializing, by the navigation unit incorporated into the mobile device, a navigation route based on the last known position at the first odometer value and a last known heading associated with the vehicle at the first odometer value in response to the comparing indicating that the current odometer value has not changed from the first odometer value.

15. The method recited in claim 1, wherein one or more of a server or the mobile device includes the memory that stores the last known position and a last known heading at the first odometer value, and wherein the current odometer value associated with the vehicle comprises a cumulative odometer value stored on the vehicle.

16. An apparatus, comprising:
means for retrieving a last known position associated with a vehicle at a first odometer value associated with the vehicle from a memory accessible to the apparatus in response to the apparatus establishing a link with the vehicle, wherein the last known position and the first odometer value associated with the vehicle are stored in association in the memory;
means for reading a current odometer value from the vehicle via the established link with the vehicle;
means for comparing the first odometer value associated with the last known position to the current odometer value read from the vehicle;
means for using the last known position associated with the vehicle at the first odometer value as an initial position of the apparatus at navigation start-up for subsequent positioning by the apparatus in response to the comparing indicating that the current odometer value has not changed from the first odometer value associated with the last known position; and
means for receiving signals for deriving position information from the signals for aiding the subsequent positioning by the apparatus.

17. The apparatus recited in claim 16, wherein the initial position of the apparatus has an estimated error that substantially corresponds to an estimated error associated with the last known position at the first odometer value in response to the comparing indicating that the current odometer value has not changed from the first odometer value.

18. The apparatus recited in claim 17, further comprising:
means for retrieving, from the memory, a last known heading associated with the vehicle at the first odometer value; and
means for using the last known heading at the first odometer value as an initial heading of the apparatus for the subsequent positioning by the apparatus in response to the comparing indicating that the current odometer value has not changed from the first odometer value.

19. The apparatus recited in claim 16, further comprising means for defining a radius around the last known position in response to the comparing indicating a non-zero difference between the first odometer value and the current odometer value, wherein the defined radius limits a distance from the last known position that can be used for the subsequent positioning by the apparatus.

20. The apparatus recited in claim 19, further comprising means for estimating the initial position of the apparatus based on the defined radius in combination with one or more of data obtained from a satellite or data stored on the vehicle in response to the first odometer value and the current odometer value having a non-zero difference.

21. The apparatus recited in claim 20, further comprising:
means for scaling an estimated error associated with the initial position according to the difference between the first odometer value and the current odometer value; and
means for determining whether to use the initial position or calculate a different initial position based on data from one or more satellites based on the scaled estimated error.

22. The apparatus recited in claim 16, wherein the memory is further configured to store the last known position and the first odometer value associated with the vehicle in association with an identifier corresponding to the vehicle.

23. The apparatus recited in claim 16, further comprising:
means for retrieving, from the memory, one or more models associated with the vehicle; and means for using the one or more models associated with the vehicle to perform dead reckoning based on the initial position.

24. The apparatus recited in claim 23, further comprising:
means for using the one or more models to determine whether a current position associated with the vehicle has substantially changed from the last known position despite the current odometer value indicating no change from the first odometer value; and
means for calculating the initial position of the apparatus based on one or more of data from one or more satellites or data stored on the vehicle in response to the one or more models indicating that the current position associated with the vehicle has substantially changed from the last known position.

25. The apparatus recited in claim 23, wherein the one or more models include parameters relating to one or more of a last known sensor bias, an odometry scale factor, an estimated lever arm, turning rate statistics, velocity statistics, or vehicle motion statistics.

26. The apparatus recited in claim 16, further comprising means for assuming a beacon role to share at least the last known position at the first odometer value over one or more communication interfaces.

27. The apparatus recited in claim 16, wherein the apparatus comprises a first mobile device and the apparatus further comprises:
means for retrieving the last known position from a server; and
means for transferring the last known position retrieved from the server and a last known heading associated with the vehicle at the first odometer value to a second mobile device, wherein an estimated error associated with the last known position and the last known heading is based on a difference between the first odometer value and the current odometer value.

28. The apparatus recited in claim 16, further comprising means for initializing a navigation route based on the last known position at the first odometer value and a last known heading associated with the vehicle at the first odometer value in response to the comparing indicating that the current odometer value has not changed from the first odometer value.

29. An apparatus, comprising:
a communication interface configured to establish a link with a vehicle;
one or more processors configured to retrieve a last known position associated with the vehicle at a first odometer value associated with the vehicle from a memory configured to store the last known position in association with the first odometer value, to read a current odometer value from the vehicle via the established link with the vehicle, and to compare the first odometer value associated with the last known position to the current odometer value read from the vehicle;
a navigation unit configured to use the last known position associated with the vehicle at the first odometer value as an initial position associated with the apparatus at navigation start-up for subsequent positioning by the apparatus in response to the comparing indicating that the current odometer value has not changed from the first odometer value associated with the last known position; and
a receiver or transceiver configured to receive signals for deriving position information from the signals for aiding the subsequent positioning by the apparatus.

30. A non-transitory computer-readable storage medium having computer-executable instructions recorded thereon, wherein executing the computer-executable instructions on a mobile device having one or more processors causes the one or more processors to:
retrieve, from a memory accessible to the mobile device, a last known position associated with a vehicle at a first odometer value associated with the vehicle in response to the mobile device establishing a link with the vehicle, wherein the last known position and the first odometer value associated with the vehicle are stored in association in the memory;
read a current odometer value from the vehicle via the established link with the vehicle;
compare the first odometer value associated with the last known position to the current odometer value read from the vehicle; and
use, by a navigation unit incorporated into the mobile device, the last known position associated with the vehicle at the first odometer value as an initial position of the mobile device at navigation start-up for subsequent positioning by the mobile device in response to the comparing indicating that the current odometer value has not changed from the first odometer value associated with the last known position, the mobile device including a receiver or transceiver to receive signals for deriving position information from the signals for aiding the subsequent positioning by the mobile device.

* * * * *